(12) United States Patent
Garner (10) Patent No.: US 7,145,298 B1
(45) Date of Patent: Dec. 5, 2006

(54) COMPACT BATTERY POWERED HEAVY ROLL MOVER

(75) Inventor: Wesley Bryan Garner, Oshkosh, WI (US)

(73) Assignee: Productive Solutions, Inc., Neenah, WI (US)

( * ) Notice: Subject to any disclaimer, the term of this patent is extended or adjusted under 35 U.S.C. 154(b) by 0 days.

(21) Appl. No.: 11/287,160

(22) Filed: Nov. 23, 2005

(51) Int. Cl.
*B62D 51/04* (2006.01)

(52) U.S. Cl. .......................... 318/17; 180/19.1; 74/13; 414/498

(58) Field of Classification Search ................ 318/3, 318/17, 139, 558; 180/11, 14.1, 14.2, 14.7, 180/19.1, 342, 904; 74/11, 13; 414/498, 414/499; 105/26.1, 89, 90.1, 90.2
See application file for complete search history.

(56) References Cited

U.S. PATENT DOCUMENTS

| | | | | |
|---|---|---|---|---|
| 2,432,156 A | * | 12/1947 | Hill | 89/1.13 |
| 2,949,972 A | * | 8/1960 | Wirkkala | 180/19.1 |
| 3,676,989 A | * | 7/1972 | Slayton | 56/10.5 |
| 4,087,008 A | * | 5/1978 | Silva, Jr. | 414/563 |
| 4,098,344 A | * | 7/1978 | Johnson | 172/40 |
| 4,530,411 A | * | 7/1985 | Grinwald | 180/11 |
| 4,582,154 A | * | 4/1986 | Englund | 180/342 |
| 5,439,069 A | * | 8/1995 | Beeler | 180/11 |
| 5,816,035 A | * | 10/1998 | Schick | 56/15.2 |

* cited by examiner

*Primary Examiner*—Bentsu Ro
(74) *Attorney, Agent, or Firm*—Nicholas A. Kees; Godfrey & Kahn, S.C.

(57) ABSTRACT

A compact battery powered mover for heavy rollable loads, having a ventilated battery compartment incorporated into the body of the mover and a removable rechargeable ventilated battery that permits the replacement of a spent battery with a fresh battery at the work location. The mover also has incorporated into its compact design a motor controller that enables the use of a heavy current draw when needed for brief periods without developing excessive heating. The configuration of the critical components in and on the mover body permits the substitution of one critical component with another component having different operating properties without significantly changing the compactness of the mover.

20 Claims, 7 Drawing Sheets

COMPACT BATTERY POWERED HEAVY ROLL MOVER

BACKGROUND OF THE INVENTION

This invention relates to roll movers for moving large heavy rolls of materials and other heavy rollable loads, and more specifically to roll movers which are compact in size and powered by removable and rechargeable batteries.

Surface drive movers of the type wherein a driven roller engages a rolling surface of a vehicle wheel or a roll of material to be moved have long been known in the art. These movers typically receive their energy through an attached electrical cord or a hydraulic or air hose. In use, the movers require long lengths of hose or cord and consequentially the movers suffer from the problems and hazards associated with having long cords or hoses dragged over the surface of a work area.

Industry has long desired but heretofore not achieved a compact battery powered surface drive roll mover for moving heavy rolls of material such as paper, plastic and metal. There have been earlier attempts at providing battery powered roll movers for use in moving large heavy rolls of materials. Those attempts have not been completely successful due to problems related to the high energy requirements over short periods of time that are associated with moving large heavy rolls of material.

A second set of unmet conditions for a successful battery powered surface drive roll mover are related to size limitations imposed by the limited amount of space under two rolls that are in contact with each other. A successful battery powered surface drive roll mover must be able to be inserted underneath two rolls in contact with each other and turned to engage the roll to be moved.

A third unmet set of conditions for a successful battery powered surface drive roll mover are related to the range of weights found in rolls of the same size but of differing materials. A heavy roll of paper that is eight feet long and three feet in diameter will typically weigh approximately one ton. The same size very heavy roll of copper foil will weigh more than fifteen tons. A successful surface drive roll mover for moving very heavy rolls will have the same size restrictions as those for heavy rolls, but significantly different power and component requirements.

Early applications of such friction drive apparatus were to move wheeled vehicles such as airplanes, train cars, trailers and the like in difficult to maneuver locations such as parking, repair, and storage areas.

U.S. Pat. No. 2,432,156 to Hill (1947), discloses a friction drive for moving rollable loads which employs a mover configured to be positioned under large diameter wheels of heavy rollable loads (railroad car wheels). The mover of Hill utilizes an electrical cord as a power source.

U.S. Pat. No. 2,949,972 to Wirkkala (1960) discloses the earliest example of a battery powered friction drive mover of rollable loads known to the inventor. The mover was used for towing aircraft in hangers and repair facilities.

U.S. Pat. No. 4,582,154 to England discloses a friction drive for moving rollable loads (vehicles) that is powered by an electrical, pneumatic or hydraulic motor which receives its energy through a cable or hose in the handle.

As industry develops larger and heavier rolls, there is a tendency to require greater and greater performance capabilities of a roll mover unit. Heretofore, units that were challenged beyond their performance capabilities simply stalled out, heated up, or broke down.

Heretofore, the prior art has not provided a compact battery powered mover for moving heavy and very heavy rolls of materials such as paper, plastic and metal. More specifically, the prior art does not provide a friction-drive heavy roll mover of the type disclosed hereinafter powered by a small, light weight, air cooled, removable, rechargeable battery carried on the roll mover body that can deliver the power required to move a heavy roll of material.

Still more specifically, the prior art does not provide the compact battery powered roll mover as described above wherein the battery is a ventilated battery and the battery compartment is ventilated.

Still more specifically, the prior art does not provide the compact battery operated heavy roll mover as described above wherein the mover can be configured to have significantly different operating characteristics by modifying the critical components of the mover without significantly changing the compact size of the mover.

BRIEF SUMMARY OF THE INVENTION

The invention provides a compact battery-powered surface drive roll mover comprising a roll mover body having a front end, a back end, a first side and a second side, a top, and bottom; at least one floor engaging roller deployed across the front-bottom end of the body and at least one roll engaging roller deployed across the front-top end of the body and the floor engaging roller and the roll engaging rollers are driven to rotate in opposite directions at approximately the same surface speed; at least one wheel mounted on the body at the back end of the body; a battery compartment located inside the body; a direct-current motor mounted on the first side of the body and a gear assembly mounted between the first side and the second side of the body and the motor drives the gear assembly and the gear assembly drives the roll engaging roller, and the gear assembly has a reduction capability of at least 20:1; a rechargeable, light weight, battery that is readily placed in and removed from the battery compartment and readily connected to and disconnected from an electrical coupling that feeds electricity from the battery to the electric motor and its related circuitry; an articulated handle secured to the top-center of the body and the handle projects up and away from the body towards the back end of the body and the handle is provided with an on-off switch and a motor controller operably connected to the motor and its related circuitry.

It is therefore an object of this invention to provide a compact battery powered heavy roll mover that is powered by a small, light weight rechargeable battery that is removable from the unit at the job site and replaceable with a charged battery, thereby obviating the removal of the unit from service to recharge the battery.

Further, it is an object of this invention to provide a roll mover as described above wherein the roll mover is provided with electrical circuitry that protects the mover from overheating when operated at a preset maximum current draw for short periods of time and will shut the unit down if temperatures exceed a preset limit.

It is further an object of this invention to provide the roll mover described above wherein the critical components of the roll mover can be changed to meet the requirements for moving rolls of specific materials without increasing the size of the unit appreciably.

Specifics of how these and other objectives are met by this invention will be made apparent from the following specifications, drawings, and appended claims.

DETAILED DESCRIPTION OF THE INVENTION

In the drawings like numbers refer to like objects, the proportions of some components have been modified, and some non-critical components have been omitted for clarity of illustration.

The term "heavy roll" as used herein shall be read to mean rolls weighing 1,000 pounds or more.

The term "ventilated battery" as used herein shall be read to mean a battery wherein the cells of the battery are separated to permit air to circulate between the cells and two opposite sides of the battery are open to permit air to flow through the battery.

The term "small space" as used herein shall be understood to mean "of a size that can readily be inserted between and under two heavy rolls that are in contact with one another."

The term "compact" as used herein shall be understood to mean "closely and neatly packed together, having all the necessary components or features neatly fitted into a small space."

Referring now to FIGS. 1 through 4, a preferred embodiment of this invention is shown. Battery powered roll mover 1 has a roll mover body 2 having a front end 3, a back end 4, a first side 5 and a second side 6, a top 7, and a bottom 8. At least one floor-engaging roller 10 is deployed across the front-bottom end of the body and at least one roll-engaging roller 11 deployed across the front-top end of the body. The floor engaging-roller 10 and the roll-engaging roller 11 are driven to rotate in opposite directions at approximately the same surface speed. At least one and preferably two back wheels 12 are rotatably mounted on the body 2 at the lower-back end of body 2. A ventilated battery compartment 13 is located inside body 2. A motor 14, preferably direct-current motor, is mounted within the body 2, preferably on the first side 5 of body 2, and a roller drive assembly 18 is also mounted within the body 2, preferably on second side 6 of body 2. A gear reducer 19 is also located inside body 2, and is connected between motor 14 and roller drive assembly 18. Motor 14 thereby drives the gear reducer 19 and the gear reducer drives roller drive assembly 18. Roller drive assembly 18 in turn drives roll engaging roller 11. In the most preferred embodiment, the gear reducer 19 has a reduction of at least 20:1, so as to drive floor engaging roller 10 and the roll engaging roller 11 at a high torque and at a low revolution per minute rate, since motor 14 is therefore turning at least twenty times the rate of the roll engaging roller 11. The embodiments shown in the figures also provide a rechargeable ventilated battery 16 that is readily placed in and removed from battery compartment 13.

Battery 16 may be composed of any suitable quick charge battery cells, including nickel-cadmium and nickel-metal-hydride as well as other types of suitable quick charge battery cells. Battery 16 is readily connected to and disconnected from an electrical coupling 17 that feeds electricity to the electric motor 14 and its related circuitry, as will be explained subsequently. A handle 20 is secured to body 2, preferably at the top of the body in front of battery compartment 13 and behind roll engaging roller 11. Handle 20 projects upward and rearward from body 2 in the direction of back end 4. Handle 20 is provided with at least an on-off switch 21, and preferably also a motor control throttle 22.

Figure 1:
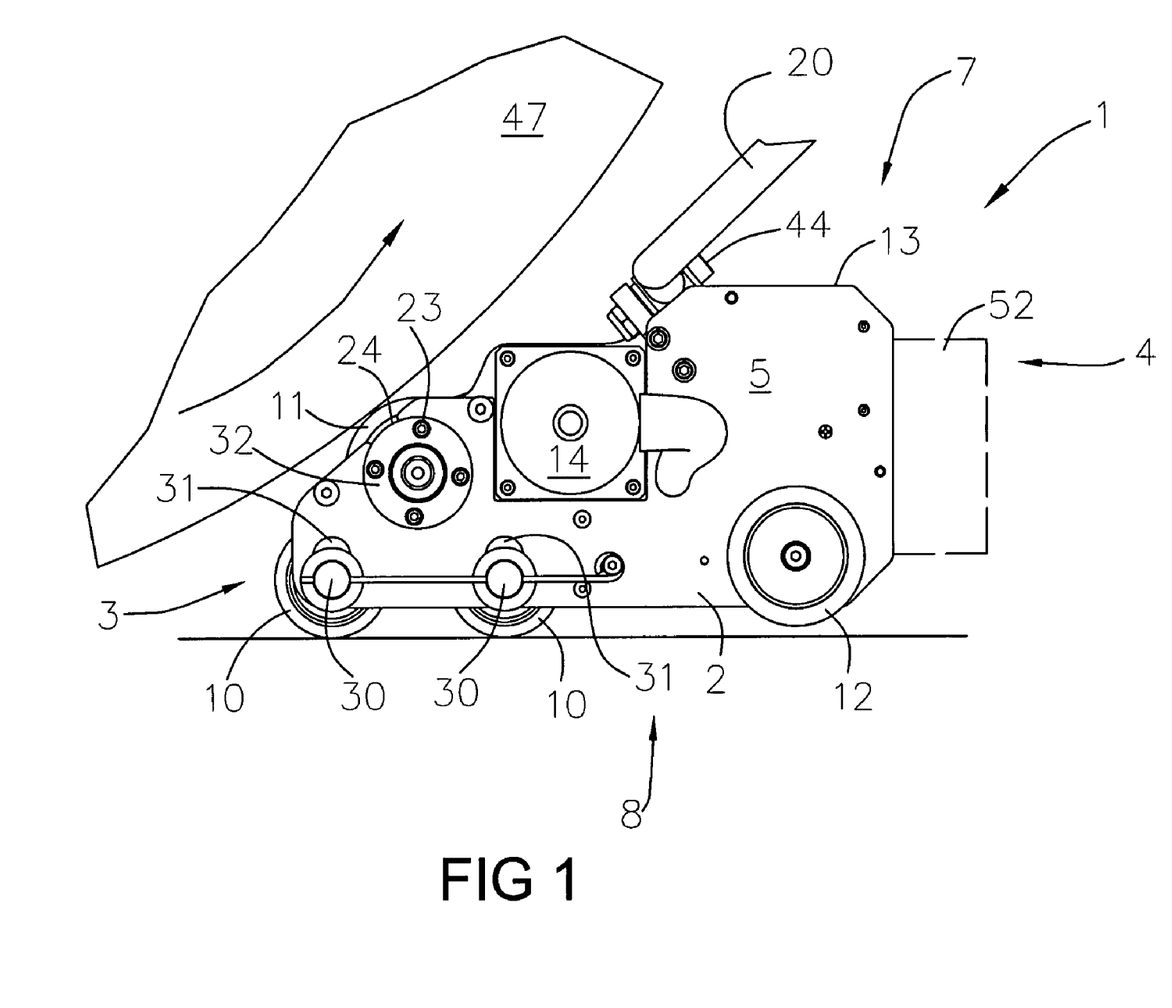
FIG. 1 is a side elevation view of a preferred configuration of the roll mover of this invention engaged with a roll to be moved.
Figure 2:
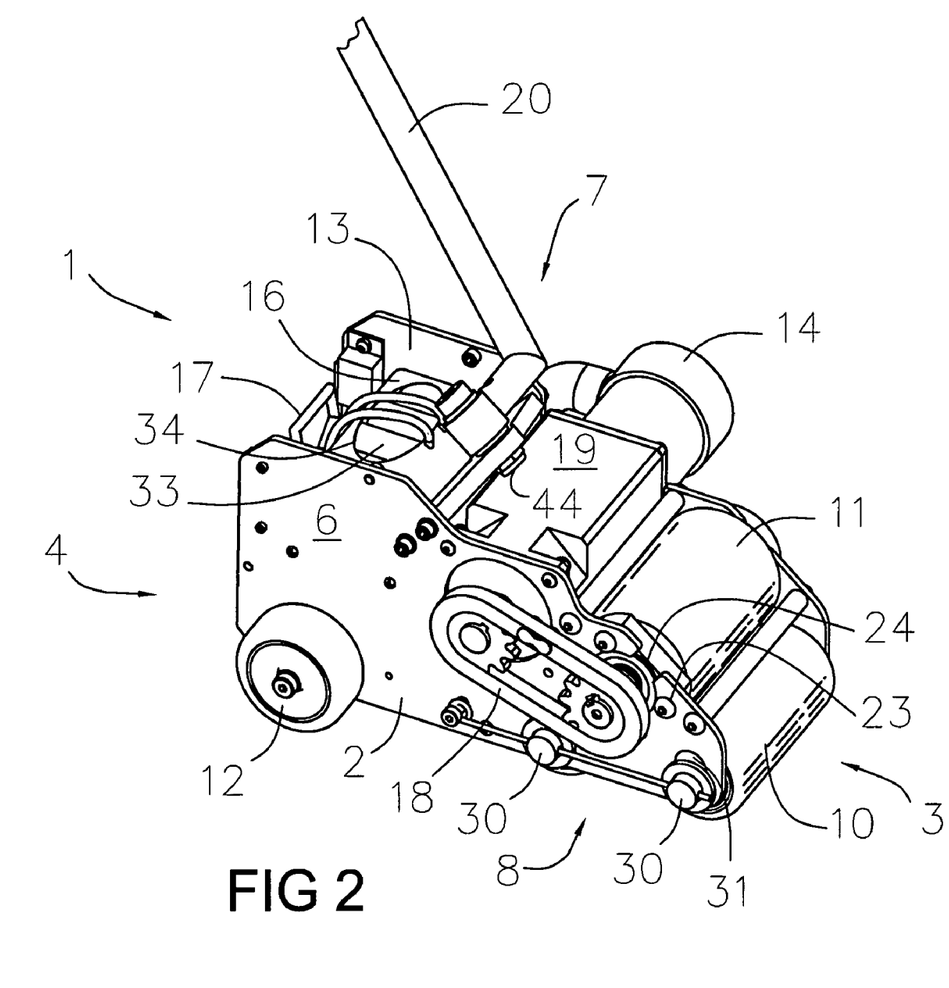
FIG. 2 is a perspective view of the roll mover of FIG. 1.

In the embodiment shown in FIGS. 1 and 2, body 2 has two floor engaging rollers 10. Each floor-engaging roller has its axle 30 mounted in a respective slot 31. This mounting arrangement permits rollers 10 to maintain frictional engagement with roll-engaging roller 11 as the rollers wear and to transmit loads directly from roll-engaging roller 11 through floor-engaging rollers 10 to the floor. While one floor-engaging roller 10 will serve, two rollers 10 are preferred.

In the drawings, roll mover 1 is shown to be provided with two back wheels 12. While a single back wheel or a roller will serve, the use of two wheels as shown is preferred because it provides more stability and maneuverability when the weight of roll mover 1 is transferred to the back wheels so that roll mover 1 can be wheeled around without the use of power.

Figure 5:
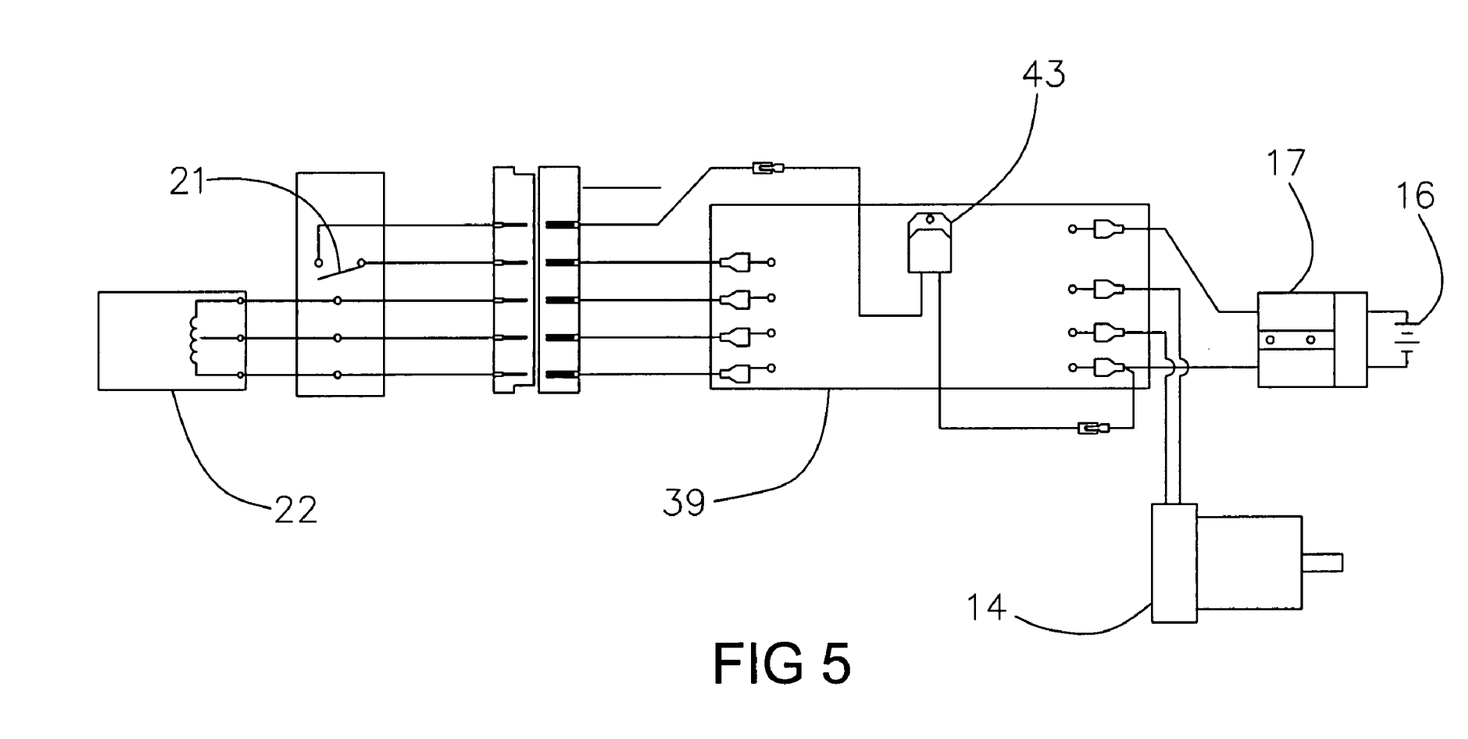
FIG. 5 is a wiring diagram for the roll mover of FIG. 1.
Figure 6:
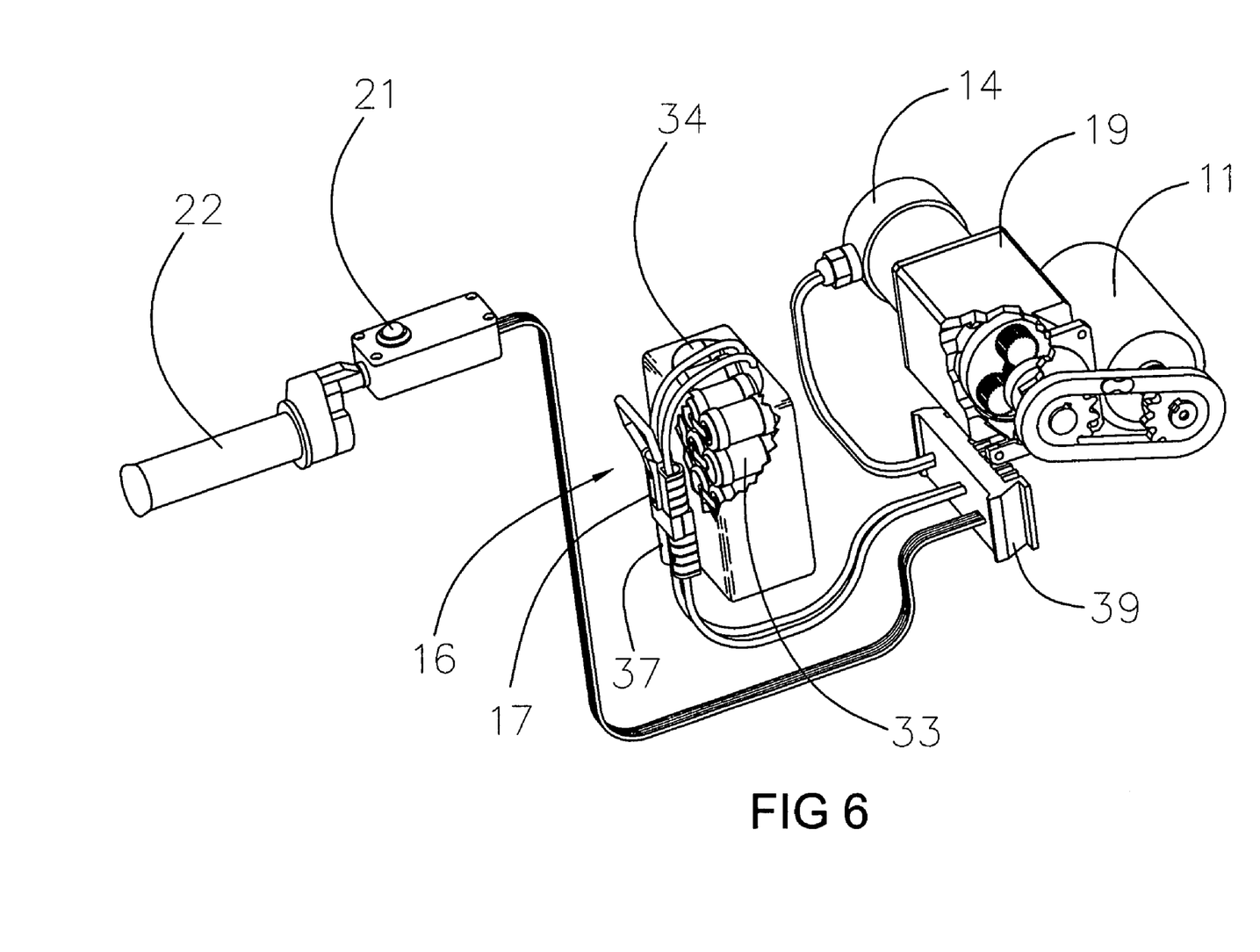
FIG. 6 is schematic representation of the physical arrangement of the critical components of the mover of FIG. 1.

Referring now to FIGS. 1, 5 and 6, ventilated battery 16 has cells 33 which are spaced apart from each other so that air can flow around and between the cells, and open ends 34 of battery case 36 will permit air to flow freely through battery case 36. Air is permitted to enter ventilated battery compartment 13 through vents (not shown) in compartment 13 and to flow through battery 16. Roll mover 1 is provided with a quick release connector 37 that engages with electrical coupling 17 which serves to transfer electricity to a motor controller 39 or to connect battery 16 to a charger. A non-ventilated battery in a non-ventilated battery compartment will serve, but a ventilated battery and a ventilated compartment are preferred.

Referring now to FIGS. 5 and 6, which show the electrical components of mover 1, motor controller 39 is shown connected between the motor 14 and the battery 16. In this embodiment, motor controller 39 serves two critical functions that are related to the high energy demands for short periods of times and essential to a successful compact battery powered heavy roll mover. The first is related to the heating of the battery 16, the motor 14 and the motor controller 39. The second is related to delivering full power in short bursts to the roll contacting roller 11 at times of maximum demand to overcome static inertia while avoiding overheating of the electrical components of mover 1.

The static inertia of a roll requires more power to overcome than the power required for increasing or maintaining the dynamic inertia of the roll. Accordingly, to get a roll moving, a high power draw capability is provided to roll mover 1 for a short interval. The high power draw results in heat build up in ventilated battery 16, in motor 14, and in motor controller 39. To deal with the high current draws needed to overcome the static inertia of heavy rolls, in the most preferred embodiment motor controller 39 includes a pulse width modulation component 43 which will detect when a preset maximum current draw has been reached, at which time pulse width modulator 43 begins to interrupt and reestablish the high current flow rate at short intervals, thereby providing the power needed to get a heavy roll moving, while at the same time slowing the rate of heat buildup in motor 14 and ventilated battery 16, and motor controller 39 itself. In a preferred embodiment, the motor controller 39 has the additional capability of shutting off the unit in the event of overheating. Alternatively or in addition, conventional overheat thermal switches (not shown) may also be included to interrupt power to the unit if a preset overheat temperature is reached.

The space beneath and between two rolls that are in contact with each other places limitations on the size of a roll mover 1 that can be inserted under the gap between the rolls to move one roll away from the other roll. The short term current flow required to overcome static inertia in a heavy roll requires a current limiting system and overheat protection. Prior art attempts to provide a battery powered roll mover for heavy rolls have been unsuccessful due in part to their inability to reduce battery size while providing the current delivery capabilities required to get a heavy roll moving without overheating the critical components of the system. The roll mover of this invention meets those requirements.

Figure 3:
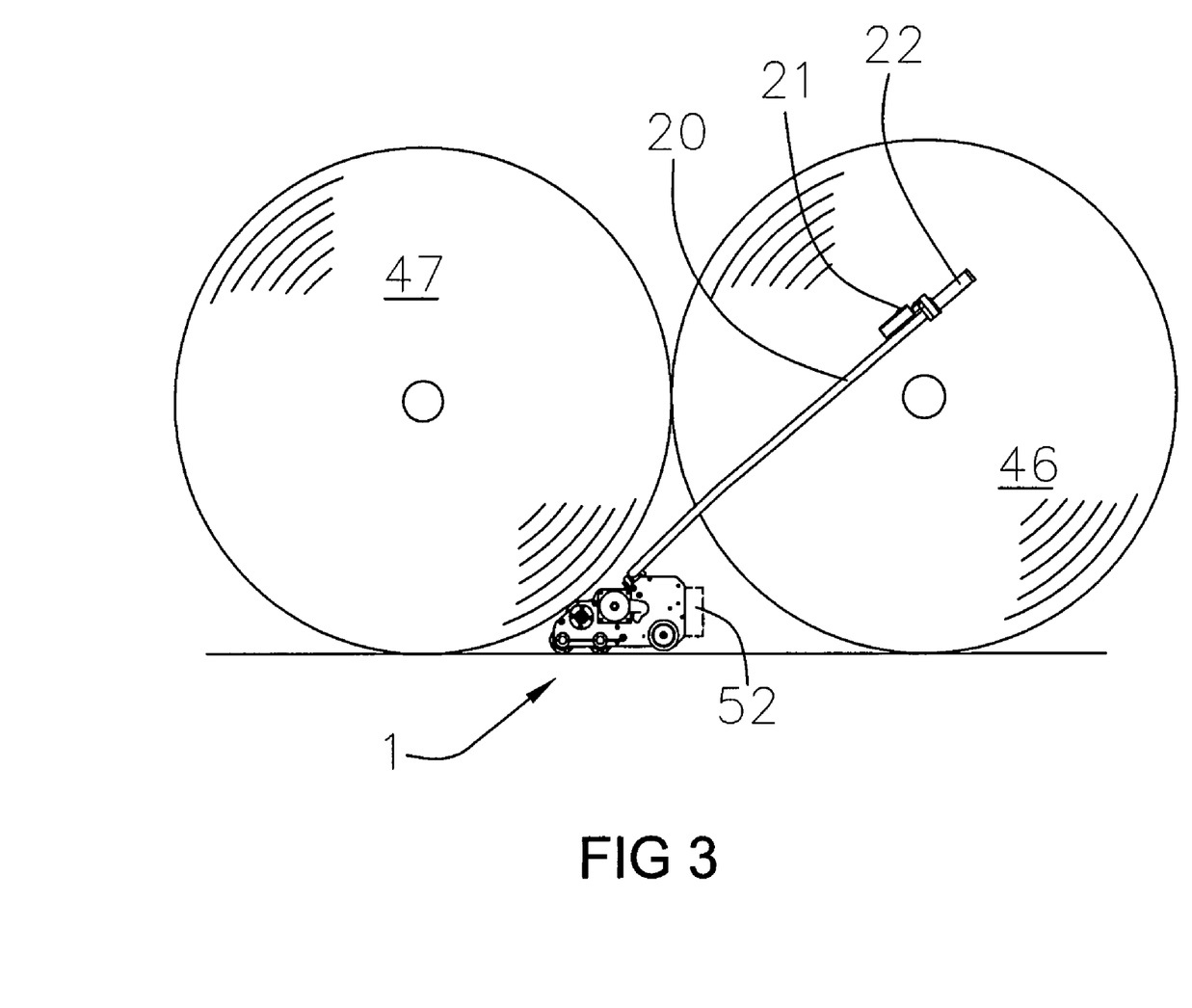
FIG. 3 is a side elevation view of the roll mover of FIG. 1 inserted under two rolls that are in contact with each other.
Figure 4:
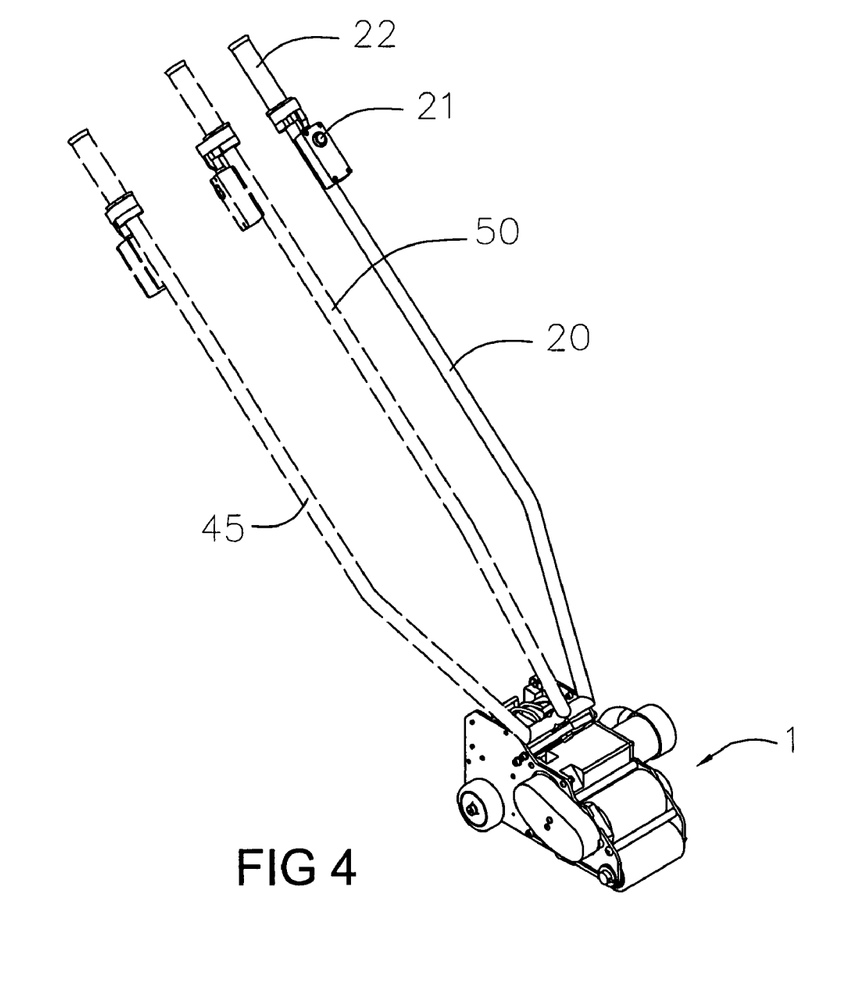
FIG. 4 is a perspective view of the roll mover of FIG. 1 illustrating the alternative positions for the articulated handle of the mover.

Referring now to FIGS. 3 and 4, the criticality of the compactness of the design of mover 1 and how it cooperates with articulated handle 20 to permit mover 1 to be inserted under two rolls in contact with each other is shown. Handle 20 in FIG. 4 is shown in position for left hand insertion under the roll to be moved 47 and roll 46. Handle 20 is joined to pivot 44 about which handle 20 may be pivoted into position 45 (shown dashed) for right hand insertion under rolls 46 and 47. Handle 20 may also be pivoted into position 50 (shown dashed) for guiding mover 1 when mover 1 is positioned in the middle of the roll to be moved.

Figure 7:
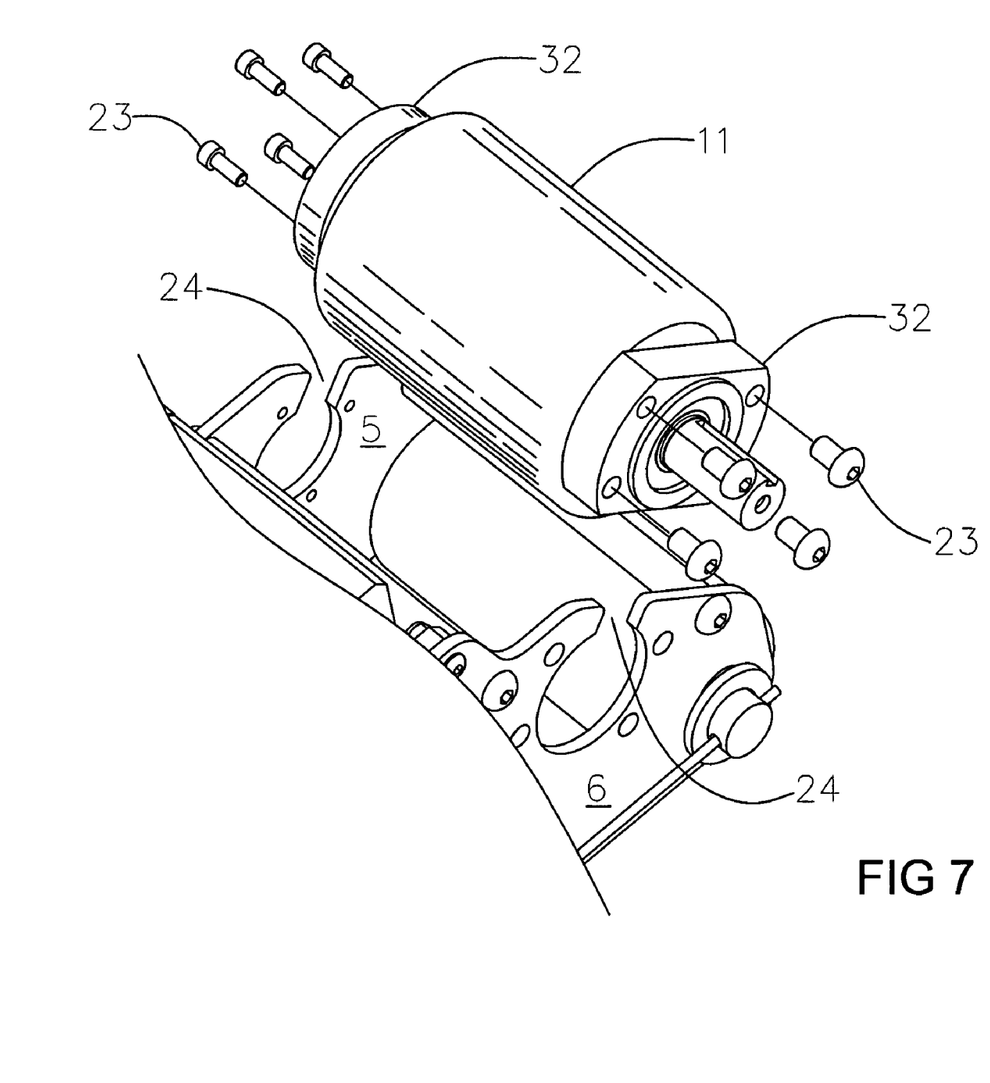
FIG. 7 is an exploded view of the roll-engaging roller assembly.

Rolls of differing materials such as rolls of paper, plastic, and metal, have significantly different weights and surface properties. Further, roll contacting roller 11 transmits the energy to move a heavy or very heavy roll and is subject to heavy loading and significant wear. It is therefore critically important that roll contacting roller 11 be readily, quickly and conveniently exchangeable with another roller 11, which may be made of a different material or have a different kind of surfacing. For example: the surface of roller 11 can be of rubber, plastic, composite material, or metal. Its surface may be smooth or rough or grooved or knurled. The invention includes any suitable mounting of the roll-contacting roller 11 to the body 2, that satisfies these conditions. Preferably, referring now to FIGS. 1 and 2 and 7, for the sake of strength given the heavy loads to be encountered, roll engaging roller 11 is mounted to first side 5 and second side 6 of mover body 2 by mounting screws 23 passing through bearings 32 to secure bearings 32 to roll mover body 2. When it is desired to remove and replace roll engaging roller 11, screws 23 are removed and roller 11 is lifted out of slots 24 of sides 5 and 6 in which axle 9 of roller 11 resides A replacement roll engaging roller 11 may then be assembled and attached to body 2 by reversing the disassembly steps.

A typical work environment for the roll mover of this invention is one wherein heavy rolls are moved away from roll forming machines, or to roll consuming machines.

The following example discloses design values for a general utility roll mover and presents a single set of values in the ranges of values that are within the scope of this invention.

EXAMPLE

A typical paper roll mover 1 capable of moving a roll weighing 5000 pounds had a ventilated battery having twenty 1.2 volt nickel-cadmium cells and had the capacity to deliver 24 volts at 80 amps. The battery had outside dimensions of about 4.5 inches by 5.5 inches by 2.2 inches and would weigh on the order of about 4 pounds. The dimensions of the body of the roll mover were about 11.2 inches wide at its widest point, 7.3 inches high, and 14.9 inches long.

The motor drew 30 amps at 24 volts when a heavy roll was being rolled.

The gear assembly produced a 40:1 reduction in rpm.

The roll engaging roller had an 85A durometer plastic or rubber coating and was mounted in heavy duty bearings that can be detached from mover 1 for easy replacement.

The roll mover has a maximum floor speed of approximately 120 feet per minute.

The above disclosures and the example cited are enabling and would permit one of ordinary skill in the art to make and use the invention for its intended purposes without undue experimentation. The inventor has shown that the critical elements of his compact battery powered roll mover are its compactness, a ventilated battery that is removable and rechargeable, and overheat protection.

It should be understood that the roll mover of this invention can be applied to tasks such as those taught by the prior art cited above. It also should be understood that it is a part of this invention to provide a compact battery operated roll mover of the type disclosed above that can be configured for application to specific tasks without departing from the basic concept of the invention or appreciably increasing the compact size of the invention.

It has been previously disclosed that rolls of the same diameter but of different materials will have significantly different weights and significantly different performance requirements for a roll mover, while still presenting the same need for compactness. The typical components of the heavy roll mover 1 recited in the above example can each be upgraded to meet the performance requirements for moving very heavy rolls without significantly changing the compactness or size of mover 1.

Referring now to FIGS. 1 through 6, ventilated battery compartment 13 can be extended in the direction of back end 4 to form extended ventilated battery compartment 52 shown dashed in FIGS. 1 and 3. The addition of compartment 52 will not interfere with the turning of mover 1 beneath two rolls in contact with each other. Compartment 52 permits the doubling of the size of battery 16. The horsepower of motor 14 can be increased with only small increases in the size of the motor housing. The motor controller 39 can be replaced with a motor controller having a different set of power requirements, and even different characteristics, without significantly changing the size of the motor controller. The motor controller 39 can even be programmable, permitting the setting and changing of characteristics without removal. In that event, such parameters as top speed and the ramp slopes for acceleration and deceleration can even be changed. Further, the gear ratio of the gears in gear box 19 can be changed without changing the size of gear box 19. As previously disclosed, roll engaging roller 11 can be exchanged for a roller 11 with different surfacing or other properties without changing the size of roller 11.

In general, as the weight of the roll goes up, the speed at which the roll can be safely moved goes down because of the inertia of the heavier roll. The above changes in the components of the typical heavy roll mover 1 of the above example permit the conversion of the typical heavy roll mover to a roll mover for very heavy rolls without appreciably modifying the critical compactness of mover 1.

A preferred embodiment of the invention has been disclosed above and it has been shown that numerous variants of the invention can be made without departing from the scope of the invention. Therefore, it should be understood that the scope of this invention should not be limited to the scope of the embodiments disclosed but the scope should also include those variants thereof that would be made apparent thereby to one skilled in the art.

What is claimed is:

1. A compact, battery powered, heavy roll mover comprising:
   a) a surface drive roll mover having a body having a front end, a back end, a first side and a second side, a top, and bottom, at least one floor engaging roller deployed across the front-bottom end of the body and at least one roll engaging roller having an axle extending outwardly along the axis of rotation of the roll engaging roller deployed across the front-top end of the body and the floor engaging roller and the roll engaging rollers are driven to rotate in opposite directions at approximately the same surface speed, and at least one wheel mounted on the body at the back end of the body,
   b) a battery compartment located inside the body near the back of the body,
   c) a direct-current motor mounted on the first side of the body,
   d) a gear box containing a reducer gear assembly located inside the body between the first side and the second side and the motor drives the gear assembly and the gear assembly drives the roll engaging roller, and the gear assembly has a reduction of at least 20:1,
   e) a light weight, rechargeable battery that is readily placed in and removed from the battery compartment and readily connected to and disconnected from an electrical coupling that feeds electricity from the battery to the electric motor and its related circuitry,
   f) a pulse width modulator electrically connected between the battery and the motor,
   g) an articulated handle secured to the body and the handle projects up and away from the body towards the back end of the body and the handle is provided with an on-off switch and a throttle.

2. The roll mover of claim 1 wherein the battery compartment is ventilated.

3. The roll mover of claim 1 wherein the battery is a light weight rechargeable ventilated battery having a quick release connector that is connectable to a charger for recharging the battery and also is connectable to the electrical coupling of the roll mover for supplying power to the roll mover.

4. The roll mover of claim 1 wherein the upper front ends of the first side and the second side are provided with slots for receiving the axle of the roll engaging roller and bearings mounted one on each end of the axle are secured by means of mounting screws to the first and second sides.

5. The roll mover of claim 1 wherein the roll mover is provided with an extended battery compartment located at the back end of the roll mover body.

6. The roll mover of claim 1 wherein the ratios of the gears in the gear assembly can be changed without changing the size of the gear box.

7. The roll mover of claim 1 wherein the motor can be replaced with a motor of a different horsepower with only a small change in the size of the motor.

8. The roll mover of claim 1 wherein the roll engaging roller can be replaced with roll engaging roller having different surfacing without significantly changing the size of the roll engaging roller.

9. A compact, battery powered, heavy roll mover comprising:
   a) a surface drive roll mover having a body having a front end, a back end, a first side and a second side, a top, and bottom, at least two floor engaging rollers deployed across the front-bottom end of the body and at least one roll engaging roller having an axle extending outwardly along the axis of rotation of the roll engaging roller deployed across the front-top end of the body and the floor engaging roller and the roll engaging rollers are driven to rotate in opposite directions at approximately the same surface speed, and two wheels mounted on each side of the body at the back end of the body,
   b) a ventilated battery compartment located inside the body near the back of the body,
   c) a direct-current motor mounted on the first side of the body,
   d) a gear box containing a reducer gear assembly located inside the body between the first side and the second side and the motor drives the gear assembly and the gear assembly drives the roll engaging roller, and the gear assembly has a reduction of at least 20:1,
   e) a light weight, rechargeable, ventilated battery that is readily placed in and removed from the battery compartment and readily connected to and disconnected from an electrical coupling that feeds electricity from the battery to the electric motor and its related circuitry,
   f) a pulse width modulator electrically connected between the battery and the motor,
   g) an articulated handle secured to the body and the handle projects up and away from the body towards the back end of the body and the handle is provided with an on-off switch and a throttle.

10. A heavy roll mover comprising:
    a body having a front end, a back end, a first side and a second side, a top, and bottom;
    at least one floor-engaging roller deployed at the front end of the body and at the bottom;
    at least one roll-engaging roller removably deployed at the front end of the body and at the top;
    at least one wheel mounted on the body at the back end of the body;
    a battery compartment located inside the body;
    a motor mounted within the body;
    a gear box, containing a reducer gear assembly, located inside the body, the gear assembly driven by the motor and driving the roll-engaging roller and the floor-engaging roller,
    a battery removably placed in the battery compartment and readily connected to and disconnected from an electrical coupling for supplying electrical energy from the battery to the electric motor and its related circuitry;
    a motor controller electrically connected between the battery and the motor;
    a handle secured to the body and projecting upward from the body; and
    an on-off switch electrically connected between the battery and the motor.

11. The roll mover of claim 10 further comprising a motor control throttle electrically connected between the battery and the motor.

12. The roll mover of claim 10 wherein the handle is connected to the body by an articulated connection.

13. The roll mover of claim 12 wherein the handle extends upward and rearward from the body.

14. The roll mover of claim 10 wherein the roll-engaging roller and the floor-engaging roller are driven to rotate in opposite directions at approximately the same surface speed.

15. The roll mover of claim 10 wherein the battery compartment is ventilated.

16. The roll mover of claim 10 further comprising a quick release connector capable of connecting the battery to a charger for recharging the battery or alternatively connecting the battery to the electrical coupling of the roll mover for supplying power to the roll mover.

17. The roll mover of claim 10 wherein
the first side and the second side each have upper front ends which are provided with slots for receiving an axle of the roll engaging roller, and
bearings mounted one on each end of the axle are secured by means of mounting screws to the first and second sides.

18. The roll mover of claim 10 wherein the roll mover is provided with an extended battery compartment located at the back end of the roll mover body.

19. The roll mover of claim 10 wherein the reduction provided by the gear assembly can be changed without changing the size of the gear box.

20. The roll mover of claim 10 wherein the roll engaging roller can be replaced with roll engaging roller having different surfacing without significantly changing the size of the roll engaging roller.

* * * * *